(12) United States Patent
Balar et al.

(10) Patent No.: US 11,388,057 B1
(45) Date of Patent: Jul. 12, 2022

(54) AGENTLESS CONTROL SYSTEM FOR LIFECYCLE EVENT MANAGEMENT

(71) Applicant: Bank of America Corporation, Charlotte, NC (US)

(72) Inventors: Rahul Balar, Murphy, TX (US); Genaro Signo, Keller, TX (US); Christopher Quinn, Indian Trail, NC (US); Hieu Xuan Hoang, Grand Prairie, TX (US); Krupali Prafulchandra Desai, Schaumburg, IL (US); Ronald David Pfiester, Carrollton, TX (US); Robert Justin Brown, Santa Monica, CA (US)

(73) Assignee: Bank of America Corporation, Charlotte, NC (US)

( * ) Notice: Subject to any disclaimer, the term of this patent is extended or adjusted under 35 U.S.C. 154(b) by 15 days.

(21) Appl. No.: 17/176,228

(22) Filed: Feb. 16, 2021

(51) Int. Cl.
| | |
|---|---|
| *H04L 41/08* | (2022.01) |
| *H04L 41/082* | (2022.01) |
| *H04L 41/16* | (2022.01) |
| *H04L 9/40* | (2022.01) |
| *H04L 41/0869* | (2022.01) |

(52) U.S. Cl.
CPC ........ *H04L 41/0886* (2013.01); *H04L 41/082* (2013.01); *H04L 41/0869* (2013.01); *H04L 41/16* (2013.01); *H04L 63/102* (2013.01); *H04L 63/20* (2013.01)

(58) Field of Classification Search
CPC .............. H04L 41/0886; H04L 41/082; H04L 41/0869; H04L 41/16; H04L 63/102; H04L 63/20
See application file for complete search history.

(56) References Cited

U.S. PATENT DOCUMENTS

| | | | |
|---|---|---|---|
| 7,003,661 B2 | 2/2006 | Beattie et al. | |
| 7,103,650 B1 | 9/2006 | Vetrivelkumaran et al. | |
| 8,613,057 B2 | 12/2013 | Rowley | |
| 8,880,893 B2 * | 11/2014 | Moghe | H04L 63/1441 713/182 |
| 8,898,457 B2 | 11/2014 | Fu et al. | |
| 9,225,525 B2 | 12/2015 | Fu et al. | |

(Continued)

OTHER PUBLICATIONS

"Ansible (software)," https://en.wikipedia.org/wiki/Ansible_(software). Wikimedia Foundation, Inc., Dec. 15, 2020.

(Continued)

*Primary Examiner* — Patrice L Winder
*Assistant Examiner* — Angela M Widhalm de Rodriguez
(74) *Attorney, Agent, or Firm* — Weiss & Arons LLP

(57) ABSTRACT

Systems and methods are provided for efficient and automated control of software permissions and access to network resources across a complex enterprise environment. Systems may configure computer servers in response to an employment status change. Changes to employment status may include leave, termination or hiring. System may interface with a human resources data feed and detect changes to employment status. The system may enable, disable and/or delete a user's account on all appropriate computer servers. Systems may disconnect a software profile in response a detected employment change. Systems may create new software profiles in response to a detected employment change.

20 Claims, 6 Drawing Sheets

(56) References Cited

U.S. PATENT DOCUMENTS

| | | | |
|---|---|---|---|
| 9,860,818 B2 | 1/2018 | Tapia | |
| 11,093,437 B1* | 8/2021 | Pfiester | H04L 63/102 |
| 2002/0194045 A1* | 12/2002 | Shay | G06Q 10/06 |
| | | | 705/7.14 |
| 2003/0145074 A1* | 7/2003 | Penick | G06F 16/20 |
| | | | 709/223 |
| 2006/0277341 A1* | 12/2006 | Johnson | G06F 21/629 |
| | | | 710/200 |
| 2007/0245420 A1* | 10/2007 | Yong | H04L 43/00 |
| | | | 726/23 |
| 2009/0307486 A1 | 12/2009 | Grajek et al. | |
| 2011/0099527 A1 | 4/2011 | Courchesne et al. | |
| 2013/0080641 A1* | 3/2013 | Lui | H04L 43/045 |
| | | | 709/226 |
| 2017/0093640 A1* | 3/2017 | Subramanian | H04L 41/12 |
| 2017/0264493 A1* | 9/2017 | Cencini | G06F 9/5083 |
| 2017/0359774 A1 | 12/2017 | Lu et al. | |
| 2018/0060608 A1 | 3/2018 | Holden | |

OTHER PUBLICATIONS

"Ansible for Configuration Management," https://www.ansible.com/use-cases/configuration-management, Red Hat, Inc., Retrieved on Jan. 10, 2021.

"Ansible for Orchestration," https://www.ansible.com/use-cases/orchestration, Red Hat, Inc., Retrieved on Jan. 10, 2021.

"Ansible for Provisioning," https://www.ansible.com/use-cases/provisioning, Red Hat, Inc., Retrieved on Jan. 10, 2021.

"Oracle Enterprise Single Sign-on Provisioning Gateway: CONTROL-SA Integration and Installation Guide, Release 10.1.4.1.0," https://docs.oracle.com/cd/E12472_01/provisioning_gatewav/PGWRN.pdf, Nov. 2008.

"How Ansible Works," https://www.ansible.com/overview/how-ansible-works, Red Hat, Inc., Retrieved on Jan. 10, 2021.

"Representational State Transfer," https://en.wikipedia.org/wiki/Representational_state_transfer, Wikimedia Foundation, Inc., Jan. 10, 2021.

"YAML," https://en.wikipedia.org/wiki/YAML, Wikimedia Foundation, Inc., Jan. 26, 2021.

* cited by examiner

AGENTLESS CONTROL SYSTEM FOR LIFECYCLE EVENT MANAGEMENT

FIELD OF TECHNOLOGY

Aspects of this disclosure relate to controlling access to network-accessible software and hardware resources in a complex enterprise computing environment.

BACKGROUND

Large enterprise organizations may provide their personnel with access to various software and hardware resources over a network. Illustrative software resources may include database access, word processing, email applications and video conferencing.

Large enterprise organizations may employ over 750,000 members. Such large enterprise organizations may utilize over 4,000 different software applications. Access to the different software applications may be controlled by a network of over 4,500 different computer servers. The large number of members, software applications and computer servers give rise to complex enterprise environments. It is technically challenging to manage user access and permission in such complex enterprise environments.

Software applications provide functionality that allow members to efficiently perform task needed by the organization. Therefore, it is important that members are assigned software applications that they need to perform their daily tasks. However, it is also important that members are not provided access to software applications that are not needed to perform their daily tasks.

Assigning extraneous permissions to use software applications may expose the organization to an increased risk of a cyberattack on its information systems. Members who have unnecessary access to software applications may not be aware that an unused application is malfunctioning or behaving erratically. Unused software applications may not be configured appropriately or may not be updated or patched regularly.

Conventionally, a management system for controlling access to network resources operates by deploying a local agent on each network resource. For example, prior art systems, such as Control-SA required a local agent running on each computer server. The local agent would receive the changes to the configuration settings and deploy the changes on the host computer server. However, such a solution has undesirable consequences for complex enterprise environments.

For example, the local agent may crash or otherwise be unavailable. When the local agent is not available, configuration changes cannot be implemented on the host computer server. Even occasional unavailability of a local agent, when considered on the scale of a complex enterprise environment, even a small percentage of downtime may have significant impact on timely management of thousands of interconnected computer servers.

Additionally, the local agent itself consumes computing resources of the host computer server. Thus, the local agent may degrade performance of the host computer server. Across a complex enterprise environment, the collective computational resources consumed by the local agents running on thousands for host computer server may siphon substantial computing resources.

It would be desirable to apply more efficient and consistent tools for managing and control access to network resources in complex enterprise environments. As described herein, AGENTLESS CONTROL SYSTEM FOR LIFECYCLE EVENT MANAGEMENT provides technical solutions for improving the consistency and reliability of access to network resources in complex enterprise environments.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1A:
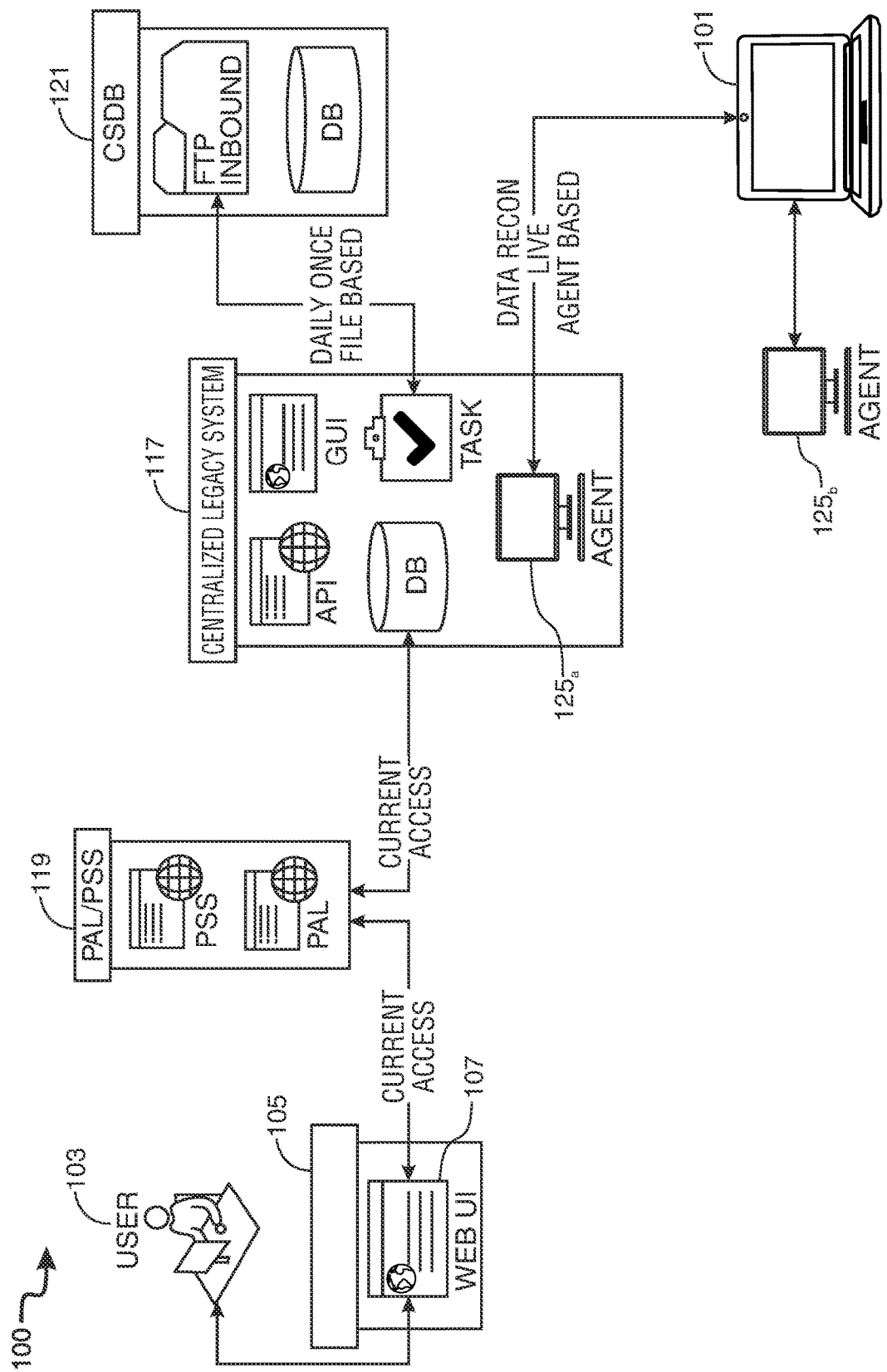
FIG. 1A shows a prior-art process flow.

A system is provided for automated account authentication. The system may provide efficient and consistent tools for managing and control access to network resources in complex enterprise environments. The system may be configured to automate management of user profiles and/or underlying access to resources deployed on large networks of interconnected systems.

For example, the systems described herein may be unusually complex enterprise environments. Such enterprise environments may include networks of 4,500 computer servers or more. The 4,500 computer servers may provide access to software tools for hundreds of thousands of employees. The sheer scale of such a complex enterprise environment requires technical solutions that address unique coordination, latency and security challenges.

The system may include at least one thousand computer servers. The computer servers may be running a version of the Unix operating system. For example, the computer servers may be running Linux, AIX or Solaris based operating systems. The computer servers may be running a Windows based operating system.

Management of the computer servers may include reconciling user accounts and user groups. User account and groups may determine who has access to network resources, such as one or more of the computer servers one the network. Management of the computer servers may include adding and/or removing entitlements to software applications running on the computer servers. Management of the computer servers may include creating, modifying or deleting user accounts. User accounts may be modified in response to a change in employment status.

Management of the computer servers may include synchronizing user passwords. Synchronizing user passwords may include providing users with an interface for self-service password management. Synchronizing user passwords may include synchronizing access to the computer servers by non-human or system accounts. Management of the computer servers may include adding and/or removing access for a human user or system account.

The system may include an agentless distribution system. The agentless distribution system may provision configuration settings for one or more computer servers. Provisioning may include deploying an initial configuration of a computer server or software application. An initial configuration may include setting up user accounts on a computer server, installing software applications on the computer servers, connecting the computer server to persistent storage, adding the computer server to a load balancer, installing security patches or any other operational tasks.

The system may include an access rights management ("ARM") computer server. The ARM server may include a user interface ("UI"). The UI may provide functionality for entering a change to configuration settings associated with one or more of the computer servers or other network resources. The change to the configuration setting may impact users who have been provisioned access to the computer server. The change may impact other computer servers that rely on functionality provided by the target computer server.

For example, a change to the configuration settings may require users to change their passwords. The change to the configuration settings may modify which users have access to a subset of the computer servers. The change to the configuration settings may modify which users have access to one or more software applications hosted by a computer server or group of computer servers.

By using an agentless distribution agent, changes to the configuration setting may be implemented without requiring a local agent running on each computer server. Prior art systems, such as Control-SA required a local agent running on each computer server. The local agent would receive the changes to the configuration settings and deploy the changes on the host computer server. However, such a solution has undesirable consequences for complex enterprise environments.

For example, the local agent may crash or otherwise be unavailable due to network latency. When the local agent was not available, configuration changes cannot be implemented on the host computer server. Even occasional unavailability of a local agent, when considered on the scale of a complex enterprise environment, may have significant impact on timely management of thousands of interconnected computer servers.

Additionally, the local agent itself consumes computing resources of its host computer server. Thus, the local agent may degrade performance of the host computer server. In a complex enterprise environment, the collective computational resources consumed by the local agents running on thousands for host computer server may siphon substantial computing resources.

An agentless approach also improves security in the complex enterprise environment. There is no need to regularly patch security flaws in each instance of agent software. There is no concern a malicious system may successfully take control of the agent, which is always active on its host computer server. The agentless distribution system may temporarily remotely connect to a host computer using SSH, Windows Remote Management or any other secure transfer protocol. After the executing a script on a target computer server, the script may send a report to the distribution system, close the connection between the distribution system and host and delete itself from memory on the target computer.

The system may include an application program interface ("API"). The API may communicate a change to the configuration settings from the ARM server to the distribution system. The API may automate conversion of the configuration change from a first format received by the ARM server from a user into a second format usable by the agentless distribution system.

The API may be configured to automate conversion of the configuration change from a first format received by the ARM server into multiple formats. For example, each of computer servers impacted by a configuration change may be running a different operating system or different software applications. To successfully implement the change across all the computer servers, the API may convert a received configuration change into a format that is processable by a specific target computer server.

The system may include a database. The database may store the changes to the configuration settings transmitted from the ARM computer server to the distribution system. The database may store responses received from the one or more computer servers in response to the distribution system provisioning the configuration changes to one or more network resources.

In response to receiving a configuration change via the UI, the ARM computer server may generate an inventory file of one or more computer servers impacted by the configuration change. Using the API, the ARM computer server may issue an instruction to the distribution system. The instruction issued by the ARM server may trigger the distribution system to provision one or more computer systems in accordance with the configuration. In response to receiving the instruction from the ARM computer server, the distribution system may execute an agentless thread on one or more of the computer servers. A "thread" may include executable instructions. The agentless thread, when run on a target computer server, may provision the target computer server in accordance with the configuration change received from the ARM server.

The ARM server may be configured to receive multiple configuration changes. The ARM computer server may be configured to formulate and issue multi-thread instructions to the distribution system. The multi-threaded instructions may provision one or more computer servers in accordance with the multiple configuration changes. The ability of the ARM server to initiate multi-threaded provisioning across thousands of computer servers may reduce time needed to successfully deploy such configuration changes across a complex enterprise environment from hours to minutes.

Multi-threaded provisioning may allow the distribution system to spawn multiple threads that execute concurrently on multiple computer servers. The distribution system may be configured to push multiple agentless threads to multiple target computer servers and provision each target computer servers in accordance with the multiple configuration changes.

The distribution system may be configured to generate a discrete agentless thread for each of the multiple configuration changes. The distribution system may be configured to generate a single agentless thread that provisions multiple configuration changes for a target computer server. The distribution system may push two or more threads to a single target computer server. The distribution system may be configured to push a discrete agentless thread for each of the one or more computer systems. Each discrete agentless thread may provision a single target computer systems in accordance with all of the multiple configuration changes.

The ARM computer server may determine a suitable number of agentless threads for provisioning one or more configuration changes. The ARM computer server may determine that, for a first target computer server, a single script can be efficiently run to provision the target computer server in accordance with multiple configuration changes. The ARM computer server may formulate a single executable thread that for provisioning the target computer server. The ARM computer server may then trigger the agentless distribution system to provision the host computer server in accordance with the multiple configuration changes by pushing the single executable thread to the target computer server.

The ARM computer server may determine that a target computer server should be provisioned by pushing two or more executable scripts to the target computer server. For example, the ARM server may determine that for a target computer server, it would be efficient to provision a first subset of multiple configuration changes using a first executable thread. The ARM computer system may determine that it would be efficient to provision a second subset of multiple configuration changes using a second executable thread.

The ARM server may formulate the first and second executable threads. The ARM server may then trigger the agentless distribution system to push the first and second threads to the target computer server and thereby provision the target computer server in accordance with the multiple configuration changes. The distribution system may schedule execution of the first and second executable threads based on performance of a target computer server. The distribution system may be configured to take account of a high priority configuration change and impact on computational performance of a target computer server before pushing an executional thread to the target computer server.

After the distribution system triggers execution of an agentless thread on one or more computer servers, the one or more computer servers are provisioned in accordance with the change to the configuration settings. Provisioning a target computer server using executable threads may be an idempotent system. An idempotent system may refer to a system that is capable of executing an operation, such provisioning a configuration change, multiple times and place the system into a single state each time the operation is executed. An illustrative operation may include triggering execution of an executable thread formulated by the ARM system on a target computer server to provision the target computer server.

An illustrative change to configuration settings may include limiting operation of the one or more computer servers to a target operating state. The target operating state may include a target set of software applications accessible to a target user or a target group of authorized users. The target operating state may include a specific formatting requirements for a user login name or a user password.

The target operational state may include provisioning an operating state for the target user(s) using infrastructure as code. Idempotency may result in the target computer server being placed into an identical operational state each time an executable thread is run on a target computer server.

A system for automated account authentication across a network of at least one thousand servers is provided. The system may include a distribution system. The distribution system may be configured to, without using a local agent, provision one or more computer server. The distribution system may provision each computer server without relying on a local agent running on any of the computer servers.

The system may include an access rights management ("ARM") computer server. The ARM computer server may include a user interface ("UI"). The UI may allow entry of at least one generic change to a configuration setting of the network. A configuration change may be considered generic when it applies categorically to two or more computer servers on a network.

The ARM server may include a software engine that generates executable threads for provisioning one or more target computer servers in accordance with the generic configuration changes. The ARM server may include a database. The database may store the generic changes to configuration settings. The database may store executable threads generated by the ARM server.

The distribution system may be configured to extract the executable threads from the database. For each target computer server included in a subset of the computer servers, the distribution system may formulate and execute an agentless thread on each member of the subset of target servers. The agentless thread may provision each member of the subset in accordance with the generic change to the configuration setting.

The agentless thread may include parameters needed to provision a target computer server. The agentless thread may include parameters for provisioning a target computer server. For example, the executable thread formulated by the ARM server may be formulated with specific parameters for a target computer server configured with target hardware and software. The distribution system may account for the specific parameters when provisioning the target computer server.

For example, the distribution system may install additional files before pushing the executable thread to one or more target computer servers. The additional files may include libraries or network settings needed to successfully provision a target computer server. The additional files may include access permission to another network resources, such as a database.

An executable thread may log a success or a failure of provisioning the generic changes to the configuration setting. The distribution system may record the success or the failure in the database. The executable thread may transmit the success failure or any other information to the distribution system. The executable thread may transmit the success failure or any other information directly to the database.

In response to receiving the generic change, the ARM server may formulate an inventory file. The inventory file may include a subset of target computer servers that need to be provisioned to implement the generic change. The distribution system may trigger execution of the executable threads on each member of the subset based on the inventory file generated by the ARM server.

The generic change to the configuration setting may be a first change. The ARM server may receive, via the UI a second change to network configuration settings. In response to receiving the second change, the ARM server may delete one or more members of the subset from the inventory file and generate a revised inventory file. The distribution system may trigger execution of the executable threads on each member of the subset based on target computer servers included in the revised inventory file generated by the ARM server.

The ARM server may formulate a sequential order of members of the subset listed in the inventory file. The distribution system may trigger execution of the executable threads on each member of the subset in the sequential order of the inventory file. For example, the order in the inventory file may ensure that a database is provisioned before a backend server, a frontend server is removed from a load balancer before it is upgraded, and a target computer server is configured for network access.

In some embodiments, the distribution system may asynchronously provision each member of the subset. The distribution system may asynchronously provision each member of the subset based on currently detected performance parameters of target computer servers included in the inventory file.

A generic configuration change may include provisioning software applications running on computer servers accessible to a target user over the network. The provisioning may include installing the software applications on target computer servers. The provisioning may include granting access to the installed software application to users or a group of users.

A method for managing user profiles and/or underlying user access across a network of at least 3,000 computer servers is provided. The method may include receiving a request to change a configuration setting for at least one user of the network. The method may include computing executable instructions for provisioning the network in accordance with the change to the configuration setting. An access rights management ("ARM") computer server may be utilized to compute the executable instructions.

The method may include formulating a deployment schedule for provisioning the network based on the executable instructions. The method may include transferring the executable instructions to an agentless distribution system. The agentless distribution system may provision the network by packaging the executable instructions into an agentless script. The agentless distribution system may push the agentless script to a target computer server and trigger execution of the agentless script on the target computer servers in accordance with the deployment schedule.

Based on the deployment schedule, the method may include formulating an inventory file. The inventory file may include a location of one or more computer servers. The location may be an internet protocol ("IP") address. The location may be a universal resource locator ("URL"). The location may be any suitable addressing scheme for locating a target computer server on a network or in a complex enterprise environment.

The computer servers in an inventory file may be listed in a pre-determined order. The distribution system may follow the pre-determined order when provisioning a subset of the computer servers. The pre-determined order may ensure that frontend and backend services, databases, monitoring, networks and storage are each provisioned in an order corresponding to functional roles of these devices and services.

The method may include triggering execution of the agentless script on one or more of members of the subset in accordance with the location listed in the inventory file. The method may include triggering execution of the agentless script on one or more of members of the subset in accordance with the order in the inventory file.

The method may include formulating an inventory file that includes a first subset of target computer servers that are eligible for asynchronous provisioning. The method may include triggering execution of the agentless script on the first subset asynchronously. The method may include triggering execution of the agentless script on a second subset of target computer servers following a sequential order.

An artificial intelligence ("AI") computer system is provided. The AI product may control access to network-accessible software and hardware resources in a complex enterprise computing environment. An illustrative complex enterprise computing environment may include a network of at least one thousand computer servers.

The AI system may include a target computer server. The target computer server may be one of the computer servers on the network. The target computer server may receive a software access request. The software access request may be initiated locally on the target computer server. The software access request may be initiated by a user of the target computer server.

The system may include an access rights management ("ARM") computer server. The ARM computer server may receive the software access request from the target computer server. The ARM computer server may dynamically calibrate a bundle of software permissions for the user. The bundle of software permissions may allow personnel or members of the enterprise organization to access one or more software applications included in the bundle via the target computer server. The target computer server may interact with other computer servers on the network to provide access to a software or hardware resource.

The ARM computer server may formulate a set of instructions for reconfiguring the one or more of the computer servers to provide the user access to the bundle of software permissions. Reconfiguring a computer server may include may provisioning updated configuration settings for the one or more computer servers. The updated configuration settings may allow one computer server to access another computer server using access credentials of the user. The ARM computer server may generate an inventory file listing the one or more of the computer servers that need to be reconfigured to provide the user access to the bundle of software permissions.

The system may include an agentless distribution system. The agentless distribution system may receive the inventory file and the set of instructions from the ARM computer server. The agentless distribution system may reconfigure the one or more computer servers listed in the inventory file in accordance with the set of instructions received from the ARM computer server. The agentless distribution system may provide confirmation to the ARM computer server that the one or more of the computer servers have been successfully reconfigured based on the set of instructions received from the ARM computer server.

The ARM computer server may dynamically calibrate the bundle of software permissions by adding at least one new software permission to the bundle of software permissions associated with the user. The new software permission may grant the user access to a new software application. To provide the user access to the new software application, the user may need to have access to additional computer servers on the network. For example, the new software application may be hosted on a computer server that the user currently does not have access to.

The ARM computer server may determine which additional computer servers the user must have access to for utilizing the new software application. The set of instructions formulated by the ARM computer server may instruct the agentless distribution system to provision the additional computer servers so that the user has access to the new software application. The ARM computer server may add the additional computer servers to the inventory file. The ARM computer server may instruct the agentless distribution system to apply the set of instructions to the computer servers listed in the inventory file.

The ARM computer server may dynamically calibrate the bundle of software permissions by associating the user with a preexisting bundle of software permissions. The ARM computer server may determine that to provide the user access to a set of software applications, it may be more efficient to dis-associate the user with a current software bundle and associate the user with a different, pre-existing software bundle.

A software bundle may define software application access rights. A user may be associated with one or more software bundles. When a user attempts to access a target computer server on the network, the computer server may determine whether the user is associated with a software bundle that grants access to the target computer server and the software applications it hosts.

Associating the user with a pre-existing software bundle may avoid spending computational resources provisioning one or more of the computer servers to provide the user access to new software applications. By associating the user with a different and pre-existing software bundle, the user may be provided permissions needed to access the computer servers that provide access to the new software applications. The different and pre-existing software bundle may provide the user access to software applications that are better calibrated to the user's current needs than the software applications included in the software bundle previously associated with the user.

In other embodiments, the ARM computer server may dynamically calibrate the bundle of software permissions currently associated with the user. The ARM computer server may formulate instructions for disassociating the user from a bundle of software permissions currently associated with the user. The ARM computer server may formulate instructions for associating the user with an updated bundle of software permissions.

The reconfiguring of the one or more of the computer servers may include updating a database that associates credentials of the user for accessing the bundle of software permissions with one or more of the computer servers. The reconfiguring may include creating an account for the user on each of the one or more computer servers. Credentials of the user may provide the user access to each of the one or more computer servers and software hosted by those computer servers.

The one or more of the computer servers may interact with the target computer server to provide the user access to the bundle of software permissions via the target computer server. For example, the user may logon locally to the target computer server. The target computer server may in turn access software applications hosted on other computers servers. For example, the other computer servers may provide access to cloud-based applications. The other computer servers may authenticate the user based on the credentials provided by the user to the target computer.

The user may be a non-human system user. For example, system accounts may be created that perform automated tasks. Such system tasks may include installation of software applications on a target computer server or backing up data stored on the target computer server. The ARM computer server may calibrate software access rights provided to a non-human system user account.

The ARM computer server may dynamically calibrate the user's software permissions by refining a software bundle associated with a user. The software bundle may control user access to software applications over the network. The ARM computer server may add software applications to the bundle associated with the user. Adding software applications to the bundle may provide the user access to the added software applications. The ARM computer server may remove software applications from the bundle associated with the user. Removing software applications from the bundle may restrict the user from accessing the removed software applications.

The ARM computer server may dynamically calibrate the bundle of software permissions by checking which users have access to the bundle. The ARM computer server may provide one or more additional users access to the software bundle. The ARM computer server may revoke access to the software bundle from one or more user. Revoking access may prevent the user from access one or more software applications associated with the bundle.

An artificial intelligence ("AI") computer program system is provided for refining software access across a network of at least one thousand computer servers. The system may include a target computer server. The target computer server may receive a change to access rights associated with a software bundle. The system may include an access rights management ("ARM") computer server. The ARM computer server may receive the change in access rights from the target computer server.

The ARM computer server may dynamically calibrate updated user permissions for the software bundle. The ARM computer server may formulate a set of instructions for provisioning one or more of the computer servers in accordance with the updated user permissions. For example, the set of instructions may define one or more computer servers and define which users or software bundles may be accessible to the users via the defined computer servers.

The system may include an agentless distribution system. The agentless distribution system may receive the set of instructions formulated by the ARM computer server. The agentless distribution system may generate system-specific executable instructions for each of the one or more of the computer servers defined by the set of instructions. The agentless distribution system may push the system-specific executable instructions to each of the one or more of the computer servers.

The agentless distribution system may include a task scheduler. The task scheduler may create a schedule for pushing the system-specific executable instructions to each of the one or more of the computer servers. Pushing the system-specific executable instructions to each of the one or more of the computer servers may reconfigure the one or more computer servers in accordance with the set of instructions formulated by the ARM computer server.

The agentless distribution system may not require a local agent running on any of the one or more computer servers. For example, the agentless distribution system may push the system-specific executable instructions to each of the one or more of the computer servers using a native secure transfer protocol running on each of the one or more of the computer servers.

The ARM computer server may generate the set of instructions using code extracted from a library of functions executable by the agentless distribution system. The agentless distribution system may provide confirmation to the ARM computer server that each of the one or more of the computer servers have been successfully provisioned in accordance with updated user permissions.

The ARM computer server may dynamically calibrate the updated user permissions by confirming that a received request to change access rights associated with a software bundle is also associated with credentials of an owner of the software bundle. In response to confirming that the request to change access rights is associated with credentials of the bundle owner, the ARM computer server may formulate a set of instructions that directs the agentless distribution system to disassociate a target user from the software bundle.

For example, an owner of a software bundle may be a project manager. The project manager may submit a request to the ARM computer server for team members to be provided with access to various software applications needed to complete the project. The ARM computer server may create a software bundle that includes the various software applications needed to the complete the project. The ARM computer server software may associate each of the team members with the software bundle. The ARM computer server software may revoke access permissions associated with the software bundle from one or more of the team members after the project is complete.

The project manager, as the owner of the software bundle, may authorize the ARM computer system to dynamically calibrate the updated user permissions associated with the software bundle. The ARM computer server may detect that the manager has assigned two or more new users to a project. Upon detecting the opening of the new project, the ARM computer server may grant the new users access to the software bundle. The ARM computer server may detect that the manager has opened a new project that is associated with a new software bundle. Upon detecting the opening of the new project, the ARM computer server may grant users assigned to the new project access to the new software bundle.

The ARM computer server may dynamically calibrate updated user permissions associated with the software bundle. For example, the ARM computer server may detect that the bundle owner has added or removed user assigned to the project. The ARM computer server may monitor progress of a project. Upon detecting completion of the project, the ARM computer server may revoke access to the software bundle.

In response to detecting a change in user access rights associated with a project, the ARM computer server may confirm that the change is associated with credentials of an owner of the software bundle. In response to detecting the change, the ARM computer server may formulate a set of instructions for provisioning one or more of the computer servers in accordance with the changed user permissions.

The AI system may include a credential validation subsystem. The credential validation subsystem may determine the owner of a software bundle. The credential validation subsystem may determine whether a change in user access rights to a software bundle is associated with credentials of the bundle owner. The credential validation subsystem may determine whether associating a target user with the software bundle complies with a network policy in effect on the target computer server and/or the one or more of the computer servers.

For example, a target user may be required to obtain additional identity verification before being provided access to one or more computer servers on the network. The target user may be required to update or change a password before being provided access to one or more computer servers on the network. Access of the target user to a first computer server may be terminated before the target user is provided access to a second computer server.

An artificial intelligence ("AI") method for preventing configuration drift across a network of at least 3,000 computer servers is provided. Methods may include, at an access rights management ("ARM") computer server, receiving a change to user access rights associated with a software bundle. Methods may include providing a user interface for a human user to input changes to user access rights directly into the ARM computer server. The changes to user access rights may include revoking or granting access to software applications or a software bundle accessible by a non-human system user.

Methods may include generating updated user permissions that implement the change to user access rights. Methods may include generating updated user permissions for a subset of the 3,000 computer servers that provide user access to software controlled by the updated user permissions.

Methods may include formulating an inventory file. The inventory file may include a location and order for provisioning the subset of the computer servers in accordance with the updated user permissions. Methods may include pushing the updated user permissions and the inventory file to an agentless distribution system. The agentless distribution system may trigger execution of an agentless script on each member of the subset. The agentless script may provision each member of the subset in accordance with the updated user permissions. The agentless script may provision each member of the subset in the order of subset members listed in the inventory file.

The order of subset members listed in the inventory file may be formulated to ensure proper orchestration when provisioning one or more of the computer servers. Provisioning each member of the subset in accordance with the updated user permissions may involve orchestrating complex relationships linking clustered applications, data centers, cloud-based systems and software applications. Orchestration ensures that during a provisioning process, tasks are triggered in a well-defined order. For example, orchestration ensures a database is provisioned before a backend server and a frontend server is removed from a load balancer before it is provisioned.

Methods may include, at the ARM computer server, formulating updated user permissions. The ARM computer server may formulate the updated user permissions using a first set of functions and associated parameters executable by the agentless distribution system. Methods may include, at the agentless distribution system generating system-specific executable instructions for each member of the subset listed in the inventory file. The system-specific executable instructions may be generated by the agentless distribution system in response to, and based on parameters provided by, the updated user permissions received from the ARM computer server.

Methods may include the agentless distribution system triggering execution of the system-specific executable instructions on each member of the subset listed in the inventory file. Triggering execution of the system-specific executable instructions may provision each member of the subset in accordance with the change to the user access rights. The agentless distribution system may include a task scheduler. The task scheduler may create a schedule for pushing to, and thereby triggering execution of the system-specific executable instructions on, one or more of the computer servers.

An artificial intelligence ("AI") system for automated access reconciliation across a network of at least one thousand computer servers is provided. The network may include a target computer server. The target computer server may receive a configuration change initiated locally on the target computer server by a user of the target computer server.

The configuration change may include changes to user access credentials. For example, the configuration change may include a change to a password or a username of the user. The configuration change may include changes to a profile resident on the target computer server. The profile may control connections linking the target computer server to other software or hardware resources on the network.

The system may include an agentless distribution system. The agentless distribution system may receive the configuration change initiated at the target computer server from the target computer server. The agentless distribution system may formulate a database update record based on the received configuration change.

The system may include an access rights management ("ARM") computer server. The ARM computer server may receive the database update record from the agentless distribution system. The ARM computer server may archive the configuration change in a database. The ARM computer server may generate an inventory file. The inventory file may list one or more of the computer servers on the network impacted by the configuration change. The inventory file may list one or more of the computer servers impacted by the configuration change in addition to the target computer server.

A computer server may be impacted by a configuration change to the target computer server when access credentials for a computer server need to be updated in response to the configuration change initiated at the target computer server. For example, the user of the target computer server may request access to a software application hosted on a remote computer server. The target computer server may require reconfiguration to access the remote computer server and provide the user access to the requested software application. The remote computer server may require reconfiguration to allow the target computer server to access the desired software application.

The ARM computer server may generate a set of instructions. The set of instructions formulated by the ARM computer server may provide instructions to the agentless distribution system for reconfiguring the one or more of the computer servers based on the configuration change. The set of instructions may provide parameters for reconfiguring each impacted computer server listed in the inventory file. The set of instructions may be executable by the agentless distribution system. The set of instructions may not be executable.

The ARM computer server may trigger the agentless distribution system to reconfigure the one or more computer servers listed in the inventory file in accordance with the set of instructions. The ARM computer server may receive confirmation from the agentless distribution system that the one or more of the computer servers have been successfully reconfigured in accordance with the set of instructions provided to the agentless distribution system.

The target computer server may initiate transmission of the configuration change received from the user to the agentless distribution system. The target computer server may initiate transmission of the configuration change using a native secure transfer protocol running on the target computer. The ARM computer server may generate the set of instructions using code extracted from a library of functions executable by the agentless distribution system. The set of instructions may include a generic list of functions and associated parameters that may be utilized by the agentless distribution system to formulate executable instructions for reconfiguring each impacted computer server.

In response to receiving the set of instructions from the ARM computer server, the agentless distribution system may generate system-specific executable instructions for each of the one or more of the computer servers listed in the inventory file. The system-specific executable instructions may include commands that implement the set of instruction on an operating systems running on each of the one or more of the computer servers listed in the inventory file.

The system-specific executable instructions formulated by the agentless distribution system may update a software application. The update may include changes to credentials for accessing the software application. The software application may be hosted on one or more of the computer servers on the network. The update may include changes to credentials for allowing the target computer to access the one or more computer servers hosting the software application.

A database update record may be a first database update record. The agentless distribution system may log a success or a failure of reconfiguring the one or more of the computer servers based pushing system-specific executable instructions (formulated based on the set of instructions provided by the ARM computer server) to each impacted computer server. The agentless distribution system may formulate a second database update record. The second database update record may record the success or the failure of reconfiguring the one or more impacted computer servers. The agentless distribution system may transmit the second database update record to the ARM computer server for recordal in the database.

The ARM computer server may determine whether to accept or reject a configuration change initiated by a user locally on the target computer server. When the configuration change includes a change to a password or a username of the user, the ARM computer server may submit the configuration change to a credential validation subsystem. The ARM computer server may submit the configuration change to the credential validation subsystem before formulating the set of instructions for the agentless distribution system. The credential validation subsystem may determine whether the configuration change received from the target computer server complies with a network policy in effect for the target computer server or impacted computer servers.

The ARM computer server may submit the configuration change to the credential validation subsystem after formulating the set of instructions for the agentless distribution system. Formulating the set of instructions may include identifying the one or more computer servers impacted by the configuration change. The credential validation subsystem may determine whether the configuration change embodied in the set of instructions formulated by the ARM computer server complies with a network policy in effect for the one or more of the impacted computer servers.

The inventory file may include an alias for the one or more of the impacted computer servers. The inventory file may include a network location of the one or more of the impacted computer servers. The network location may be a unique string of characters that identifies a computer server on the network. For example, the address may be an Internet Protocol address, a uniform resource locator ("URL"), a media access control ("MAC") address or any other suitable addressing scheme for locating a computer server on a network.

An artificial intelligence ("AI") system for automated access reconciliation across a network of at least one thousand computer servers is provided. The system may include a target computer server. The target computer server may receive a configuration change initiated locally on the target computer server by a user of the target computer server.

The system may include an agentless distribution system. The agentless distribution system may initiate a secure remote connection to the target computer system. The agentless distribution system may run an extraction script on the target computer server. The extraction script may capture the configuration change from the target computer server. The extraction script may remove itself from the target computer server after capturing the configuration change and transmitting it to the agentless distribution system.

The system may include an access rights management ("ARM") computer server. The ARM computer server may receive a secure file transfer from the agentless distribution system. The secure file transfer may include the configuration change captured by the extraction script. An exemplary secure file transfer may utilize a protocol that runs over the SSH file transfer protocol.

The ARM computer server may archive the captured configuration change in a database. The ARM computer server may identify one or more of the computer servers impacted by the configuration change (in addition to the target computer server).

The ARM computer server may generate an inventory file listing one or more of the computer servers impacted by the configuration change. The ARM computer server may formulate a set of instructions for the agentless distribution system. The set of instructions may provide instructions to the agentless distribution system for reconfiguring the one or more of the computer servers in accordance with the configuration change.

The ARM computer server may push the set of instructions to the agentless distribution system. The ARM computer server may receive confirmation from the agentless distribution system that the one or more of the computer servers have been successfully reconfigured in accordance with the set of instructions.

The agentless distribution system may configure each of the computer servers on the network to push any configuration changes received by a computer server to the agentless distribution system at least once in 24 hours. The database storing a current configuration of each computer servers on the network may be updated by the ARM computer server at least once in 24 hours. The ARM computer server may reformulate the configuration changes received from the distribution system for storage in the database.

The agentless distribution system may receive multiple configuration changes from computer servers on the network. The ARM computer server may initiate multi-thread communication with the agentless distribution system. For example, the ARM computer server may push multiple instruction sets to the agentless distribution system in parallel for each of the computer servers that need to be reconfigured by the agentless distribution system.

In some embodiments, the ARM computer server may transmit one set of instructions to the agentless distribution system. Based on the one set of instructions received from the ARM computer server, the agentless distribution system may formulate system-specific executable instructions for each of the one or more of the computer servers impacted by a configuration change. The system-specific executable instructions formulated by the agentless distribution system may include commands that implement configuration changes described in the set of instruction on an operating systems running on each of the one or more of the computer servers impacted by the configuration change.

The agentless distribution system may initiate multi-thread communication with the ARM computer server. In parallel, the agentless distribution system may transmit to the ARM computer server confirmation received from each of the one or more of the impacted computer servers after each impacted computer server has been successfully reconfigured in accordance with the set of instructions formulated by the ARM computer server.

The target computer and the agentless distribution system may communicate with each other using a command line utility that operates without interaction of a human user. In response to receiving a configuration change from a local user, a target computer server may query whether there is an available connection (e.g., ping) to the agentless distribution system. In response to the ping, the agentless distribution system may initiate a secure port 22 connection with the target computer server. A secure connection may utilize SSH-2 or Windows Remote Management.

An artificial intelligence ("AI") method for automated synchronization of configuration settings across a complex enterprise environment a network is provided. The complex enterprise environment may include a network of at least one thousand computer servers. Methods may include, at self-service password management system, receiving a change to access credentials for a target computer server. Methods may include pushing the change to an access rights management ("ARM") computer server.

Methods may include, at the ARM computer server, triggering an updating of a central repository to incorporate the change to access credentials. Methods may include formulating instructions for updating the target computer server in response to receiving the change to the access credentials. Methods may include formulating and pushing instructions to an agentless distribution system.

Methods may include using the agentless distribution system to update the target computer server. Methods may include formulating generate system-specific executable instructions for each of the one or more of the computer servers needed to update the target computer server.

Methods may include submitting a requested change to access credentials to a credential validation system. The credential validation system may determine whether a requested change to credentials complies with a network policy in effect on the target computer server. The credential validation system may be a middleware layer of the ARM computer server. The credential validation system may interface between the agentless distribution system and the ARM computer server.

An artificial intelligence ("AI") system for automated access reconciliation within a complex enterprise computing environment is provided. The complex enterprise computing environment may include a network of at least one thousand computer servers. The system may include a database. The database may store employment status of a user. The database may initiate a secure transfer of a change in the employment status to a landing location.

The database may initiate a secure transfer of any changes in the employment status to the landing location at least once every 30 minutes. The database may initiate a secure transfer of any changes in the employment status to the landing location at least once every 24 hours. An exemplary secure file transfer may utilize a protocol that runs over the SSH file transfer protocol.

The system may include an access rights management ("ARM") computer server. The ARM computer server may extract the change in employment status from the landing location. The ARM computer server may determine a configuration change for the network in response to the extracted change to employment status.

An exemplary configuration change may be restoration or revocation of user access to one or more of the computer servers on the network. An exemplary configuration change may be restoration or revocation of a software profile that provides user access to a software application running on the one or more of the computer servers.

In response to extracting the change to employment status, the ARM computer server may generate an inventory file. The inventory file may list one or more of the computer servers on the network impacted by the configuration change. A computer server may be impacted by a configuration change if access credentials for a computer server need to be updated or changed as a result of the configuration change.

A change in employment status may indicate that user credentials should be disabled. For example, the user may be on extended leave. A change in employment status may indicate that user credentials should be enabled. For example, the user may be a new hire. The one or more computer servers may need to be configured in accordance with the change in employment status.

The ARM computer server may generate a set of instructions. The ARM computer server may generate a set of instructions for each computer server listed in the inventory file. The set of instructions may provide parameters for reconfiguring each impacted computer server in accordance with the configuration change. The set of instructions may be generic, high level instructions that apply generally to computer servers on the network.

For example, the set of instructions formulated by the ARM computer server may be written in YAML or other suitable data-serialization language. YAML or other suitable data-serialization language may be used to present data and parameters, such as configuration settings for the one or more computer server, without including any executable commands.

The ARM computer server may formulate the set of instructions using code extracted from a library of functions executable by the agentless distribution system. The ARM computer server may formulate the set of instruction using a reference to each of the one or more computer servers defined in the inventory file.

The system may include an agentless distribution system. The agentless distribution system may receive the inventory file from the ARM computer server. The agentless distribution system may receive the set of instructions formulated by the ARM computer server. The set of instructions formulated by the ARM computer server may include a generic list of functions and associated parameters that may be processed by the agentless distribution system. In response to receiving the set of instructions, the agentless distribution system may generate system-specific executable instructions for each of the one or more of the computer servers listed in the inventory file.

The agentless distribution system may generate the system-specific executable instructions based on the data provided by the ARM computer server in YAML or other suitable data-serialization language file. The agentless distribution system may formulate the system-specific executable instructions using commands that provision impacted computer servers in accordance with the parameters defined in the set of instructions. The agentless distribution system may formulate system-specific instructions that are executable on an operating systems running on each of the one or more of the computer servers listed in the inventory file.

The agentless distribution system may transfer system-specific executable instructions formulated for an impacted computer server using a native secure transfer protocol. Illustrative secure transfer protocols may utilize port 22. Illustrative secure transfer protocols may include SSH-2 or Windows Remote Management.

The agentless distribution system may reconfigure each of the one or more computer servers listed in the inventory file in accordance with parameters in the set of instructions. The agentless distribution system may reconfigure the impacted computer servers by triggering execution of the system-specific executable instructions on an impacted computer server. The agentless distribution system may provide confirmation to the ARM computer server that each of the one or more of the computer servers have been successfully reconfigured.

The ARM computer server may include a credential validation subsystem. The credential validation subsystem may determine whether one or more computer servers are impacted by the configuration change based on whether the one or more computer servers host a target user account. The target user account may be associated with the extracted employment status change. The credential validation subsystem may generate an updated username and an updated password for the target user, or an account associated with the target user.

An artificial intelligence ("AI") computer program product for controlling access to software hosted within a complex enterprise computing environment is provided. The complex enterprise computing environment may include a network of at least one thousand computer servers. The system may include an access rights management ("ARM") computer server. The ARM computer server may examine employment records stored on a database. The ARM computer server may determine, based on examination of the employment records, that a change should be made to a user account.

The user account may provide a user with access to one or more of the computer servers. The user account may provide a user with access to one or more software applications or services running on the to one or more computer servers. The change to the user account may synchronize the change in employment status with the access rights provided by the user account.

A change in employment status may indicate that a user account should be disabled. For example, the user may be on extended leave or may not longer be employed by the enterprise organization. A change in employment status may indicate that a user account should be enabled. For example, the user may be a new hire.

The one or more computer servers may need to be configured so that a user account for accessing those servers is synchronized with the change in employment status. For example, the user account may need to be associated with additional privileges that provide access to a suite of software applications. Access to a software application may be removed from the user account. Access to a software application may be provided to a user account for a predetermined amount of time.

The ARM computer server may formulate a set of instructions. The set of instructions may include parameters or other data for provisioning the one or more of the computer servers in accordance with the change to the user account. The system may include an agentless distribution system. The agentless distribution system may receive the set of instructions from the ARM computer server.

The agentless distribution system may generate system-specific executable instructions for each of the one or more of the computer servers. The system-specific executable instructions may provision the one or more computer servers in accordance with parameters defined in the set of instructions formulated by the ARM computer server. The system-specific instructions may be executable on an operating systems running on each of the one or more of the computer servers listed in the inventory file. The agentless distribution system may push the system-specific executable instructions to each of the one or more of the computer servers and thereby trigger automated provisioning of the one or more computer servers in accordance with changes to the user account.

An illustrative change to the user account may include changing a username and password associated with the user account. An illustrative change to the user account may disable the user account on the one or more computer servers. An illustrative change to the user account may delete the user account from the one or more computer servers. An illustrative change to the user account may enable the user account on the one or more computer servers. An illustrative change to the user account may disable software or a software profile associated with the user account. An illustrative change to the user account may create a new software profile that does not include the user account and includes at least one other user account.

A software profile may define software application access rights. A user may be associated with one or more software profiles. When a user attempts to access a target computer server on the network, the computer server may determine whether the user is associated with a profile that grants access to the target computer server and the software applications hosted on the computer server.

An artificial intelligence ("AI") methods for automated lifecycle event management for user accounts across a network of at least one thousand computer servers is provided. Methods may include detecting a change in employment status associated with a target user. Methods may include locating at least one user account associated with the target user.

Methods may include generating an updated user account for the target user that synchronizes the employment status of the target user and access rights to the network for the target user. The update to the user account may include revoking access rights from the target user. The update to the user account may include enabling access rights for the target user. The update may synchronize the target user's employment status with access rights of the target user to the one or more computer servers on the network.

Methods may include formulating an inventory file that includes a location and order for provisioning one or more of the computer servers in accordance with the updated user account. Methods may include pushing the updated user account and the inventory file to an agentless distribution system. Methods may include formulating system-specific executable instructions for provisioning one or more of the computer servers on the network in accordance with the updated user account.

Methods may include provisioning each of the one or more computer servers such that the user account only provides access to each of the one or more computer servers when using credentials associated with the updated user account. The methods may include submitting the credentials associated with the updated user account to a validation subsystem. The validation subsystem may determine whether the updated user account complies with a network policy in effect on each of the one or more of the computer servers.

The system-specific executable instructions may include instructions for accessing the one or more computer servers using credentials associated with the user account before detecting the change in the employment status. Methods may include confirming that the user account is not accessible using the user's "old" credentials after the one or more computer servers have been provisioned in accordance with the updated user account.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1A shows illustrative prior art process 100 for reconciliation of user access to computer server 101. Procedures for access reconciliation ensure that permissioned access rights resident on a network resource, such as computer server 101, corresponds to access provisioned for those networked resources. For example, after provisioning computer server 101, a network administrator may inadvertently overrule approved access rights and grant access privileges that may expose a network resource to malicious activity. Inadvertent changes to access rights may be referred to as "configuration drift."

FIG. 1A shows that a reconciliation request for user 103 may be submitted to ARM system 105. The reconciliation request may be submitted using Web User Interface ("Web UI") 107. Access request management ("ARM") system 105 may access Provisioning Abstraction Layer ("PAL") and Password Synchronization Service ("PSS") 119 to determine access permissions and passwords provisioned for user 103 on computer server 101. PAL/PSS 119 may be a subsystem of ARM system 105.

Legacy system 117 may interact with PAL/PSS 119 to obtain access rights provisioned for computer server 101. Legacy system 117 may access agent 125*b* on computer server 101 to determine access rights resident on computer server 101. Legacy system 117 may receive actual access permissions resident on computer server 101 from agent 125*b* running on computer server 101. Agent 125*b* running on computer server 101 may interact with receiving agent 125*a* running on legacy system 117.

Based on information received from agent 125*b* running on computer server 101, legacy system 117 may reconcile access permissions stored on PAL/PSS 119 with actual access permissions resident on computer server 101. Legacy system 117 may log results of the reconciliation in centralized security database ("CSDB") 121.

Prior art process 100 utilizing legacy system 117 requires local agent 125*b* running on computer server 101. However, such a solution has undesirable consequences for complex enterprise environments. For example, local agent 125*b* may crash or otherwise be unavailable. When local agent 125*b* is not available, reconciliation processes are unavailable for computer server 101. Even a small percentage of local agent 125*b* downtime, when considered on the scale of a complex enterprise environment, may have significant negative impact on timely management of thousands of interconnected computer servers.

Additionally, local agent 125*b* itself consumes computing resources of computer server 101. Thus, local agent 125*b* may degrade performance of computer server 101 even when a reconciliation process is not being implemented. Additionally, across a complex enterprise environment, collective computational resources consumed by multiple instances of local agents 125*b* running on thousands of computer servers may siphon substantial computing resources.

Figure 1B:
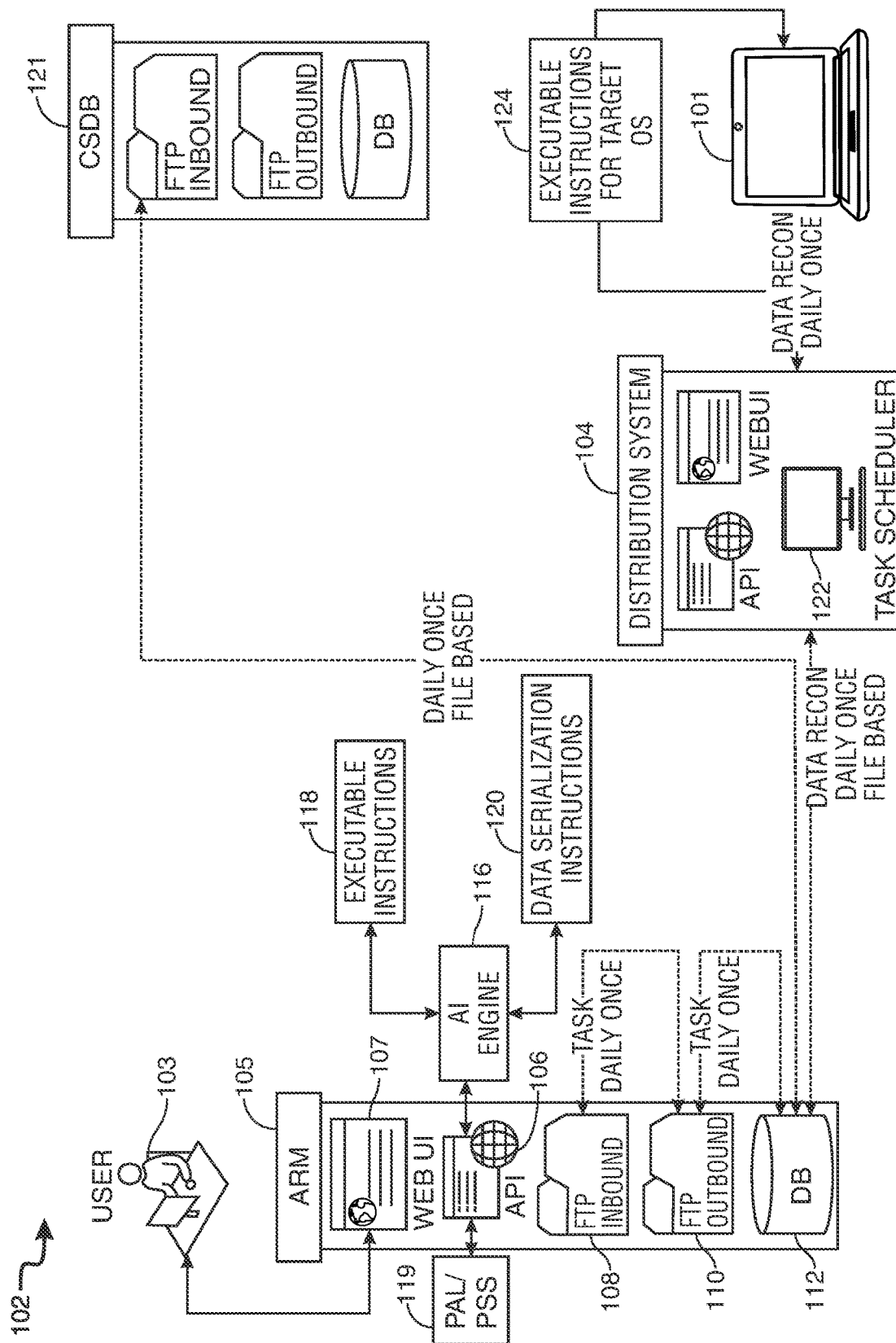
FIG. 1B shows illustrative systems and process flows in accordance with principles of the disclosure.

FIG. 1B shows improved process and systems 102 for reconciliation of user access to computer server 101. Computer systems and servers disclosed herein may include a processor circuit. The processor circuit may control overall operation of a computer server. A processor circuit may include hardware, such as one or more integrated circuits that form a chipset. The hardware may include digital or analog logic circuitry configured to perform any suitable (e.g., logical) operation.

Computer systems and servers may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Computer systems and servers may include RAM, ROM, an input/output ('I/O") module and a non-transitory or non-volatile memory. Machine-readable memory may be configured to store information in machine-readable data structures. The I/O module may include a microphone, button and/or touch screen which may accept user-provided input. The I/O module may include one or more of a speaker for providing audio output and a video display for providing textual, audiovisual and/or graphical output.

Software applications executed by the computer systems and servers may be stored within the non-transitory memory and/or other storage medium. Software applications may provide instructions to the processor that enable the computing system to perform various functions. For example, the non-transitory memory may store software applications used by an AI engine, such as an operating system, application programs, machine learning algorithms and an associated database. Alternatively, some or all of computer executable instructions of a software application may be embodied in hardware or firmware components of a computer system or server.

Software applications may include computer executable instructions for invoking user functionality related to communication, such as email, short message service ("SMS"), and voice input and speech recognition applications. Software application programs may utilize one or more algorithms that process received executable instructions, perform power management routines or other suitable tasks.

Software applications may utilize computer-executable instructions, such as program modules, executed by a processor. Generally, program modules include routines, programs, objects, components, data structures, etc. that perform particular tasks or implement particular abstract data types. A computing system may be operational with distributed computing environments where tasks are performed by remote processing devices that are linked through a communications network. In a distributed computing environment, program modules may be located in both local and remote computer storage media including memory storage devices. Computing systems may rely on a network of remote servers hosted on the Internet to store, manage, and process data (e.g., "cloud computing" and/or "fog computing").

A computer system and server may be part of two or more networks. A computing system may support establishing network connections to one or more remote computing systems. Illustrative network connections may include a local area network ("LAN") and a wide area network ("WAN"). When used in a LAN networking environment, a computing system may be connected to the LAN through a network interface or adapter. A computing system may include a communication circuit. The communication circuit may include a network interface card or adapter.

When used in a WAN networking environment, a computer system and server may include a modem, antenna or other circuitry for establishing communications over a WAN, such as the Internet. The communication circuit may include a modem and/or antenna.

The existence of any of various well-known protocols such as TCP/IP, Ethernet, FTP, HTTP and the like is presumed, and a computing system may be operated in a client-server configuration to permit a user to retrieve web pages from a web-based server. Web browsers can be used to display and manipulate data on web pages.

Computer systems and servers may include components, such as a display, battery, speaker, and antennas. Components of a computer system and server may be linked by a system bus, wirelessly or by other suitable interconnections. Components of a computer system and server may be present on one or more circuit boards. In some embodiments, the components may be integrated into a single chip. The chip may be silicon-based.

FIG. 1B shows that a reconciliation request for user 103 is submitted to ARM system 105 using UI 107. ARM system 105 may utilize application program interface ("API") 106 to formulate executable threads for performing a reconciliation process. The formulated reconciliation threads may be stored in FTP outbound folder 108 within local ARM database 112. At least once daily, reconciliation requests in FTP outbound folder 110 may be pushed to distribution system 104.

Distribution system 104 may trigger agentless execution of the executable reconciliation threads extracted from FTP outbound folder 110 on computer server 101. Distribution system 104 may not use any local agents and no additional custom security infrastructure. Distribution system 104 may push executable instructions 124 directly to computer server 101. Distribution system 104 may utilize a cryptographic network protocol for transmitting the executable thread securely to computer server 101. An illustrative cryptographic network protocol may include Secure Shell ("SSH").

In some embodiments, ARM system 105 may generate a set of instructions. ARM system 105 may generate a set of instructions for each computer server listed in an inventory file. The set of instructions may provide parameters for performing a reconciliation process on each of the computer servers listed in the inventory file. The set of instructions may not be executable.

For example, a set of instructions formulated by ARM system 105 may be written in the YAML or other suitable data-serialization language. YAML or other suitable data-serialization language may be used to present data, such as configuration settings for the one or more computer server, without including any executable commands.

The set of instructions formulated by ARM system 105 may include a generic list of functions and associated parameters that may be processed by distribution system 104. In response to receiving the set of instructions, distribution system 104 may generate system-specific executable instructions 124 for performing a reconciliation process on computer server 101 or any other computer server listed in an inventory file. ARM system 105 may utilize software engine 116 to generate executable instructions 118. ARM system 105 may utilize software engine 116 to generate data-serialization instructions 120.

Distribution system 104 may generate the system-specific executable instructions 124 based on the data and parameters provided by ARM system 105 in the YAML or other suitable data-serialization language file. Distribution system 104 may formulate system-specific executable instructions 124 for computer server 101 using commands that, when executed on computer server 101, perform a reconciliation process on computer server 101 in accordance with the parameters defined in the set of instructions 118 or 120 (provided by ARM system 105).

Distribution system 104 may transfer executable instructions 124 to computer server 101 using a native secure transfer protocol. Illustrative secure transfer protocols may utilize port 22. Illustrative secure transfer protocols may include SSH-2 or Windows Remote Management.

After executable instructions 124 are transferred and executed on computer server 101, executable instructions 124 may provide results of the reconciliation process to distribution system 104. In some embodiments, executable instructions 124 may provide results of the reconciliation process directly to ARM system 105. The results of the reconciliation process may be stored in FTP inbound folder 108. ARM system may archive FTP inbound folder 108 and FTP outbound folder 110 in CSDB 121. The process shown in FIG. 1B does not require use of a local agent running on computer server 101.

FIG. 1B also shows that computer server 101 may receive a configuration change initiated locally on the target computer server by user 103. An exemplary configuration change may include changes to user access credentials. A configuration change may include a change to a password or a username of user 103.

Distribution system 104 may receive the configuration change from computer server 101. Distribution system 104 may formulate a database update record based on the received configuration change. ARM system 105 may receive the database update record from distribution system 104. ARM system 105 may archive the configuration change in database 121. ARM system 105 may generate an inventory file (not shown). The inventory file may list one or more of the computer servers impacted by the configuration change. The inventory file may list one or more of the computer servers impacted by the configuration change in addition to computer server 101.

ARM system 105 may generate executable instructions 118 and/or data-serialization instructions 120 for reconfiguring the one or more of the computer servers based on the configuration change. ARM system 105 may transmit the executable instructions 118 and/or data-serialization instructions 120 to distribution system 104 and thereby trigger distribution system 104 to reconfigure the one or more computer servers listed in the inventory file in accordance with executable instructions 118 and/or data-serialization instructions 120.

Task scheduler 122 may create a schedule for distribution system 104 to reconfigure the one or more computer servers listed in the inventory file in accordance with executable instructions 118 and/or data-serialization instructions 120. Distribution system 104 may formulate executable instructions 124 for reconfiguring the one or more computer servers listed in the inventory file in accordance with executable instructions 118 and/or data-serialization instructions 120.

Figure 2A:
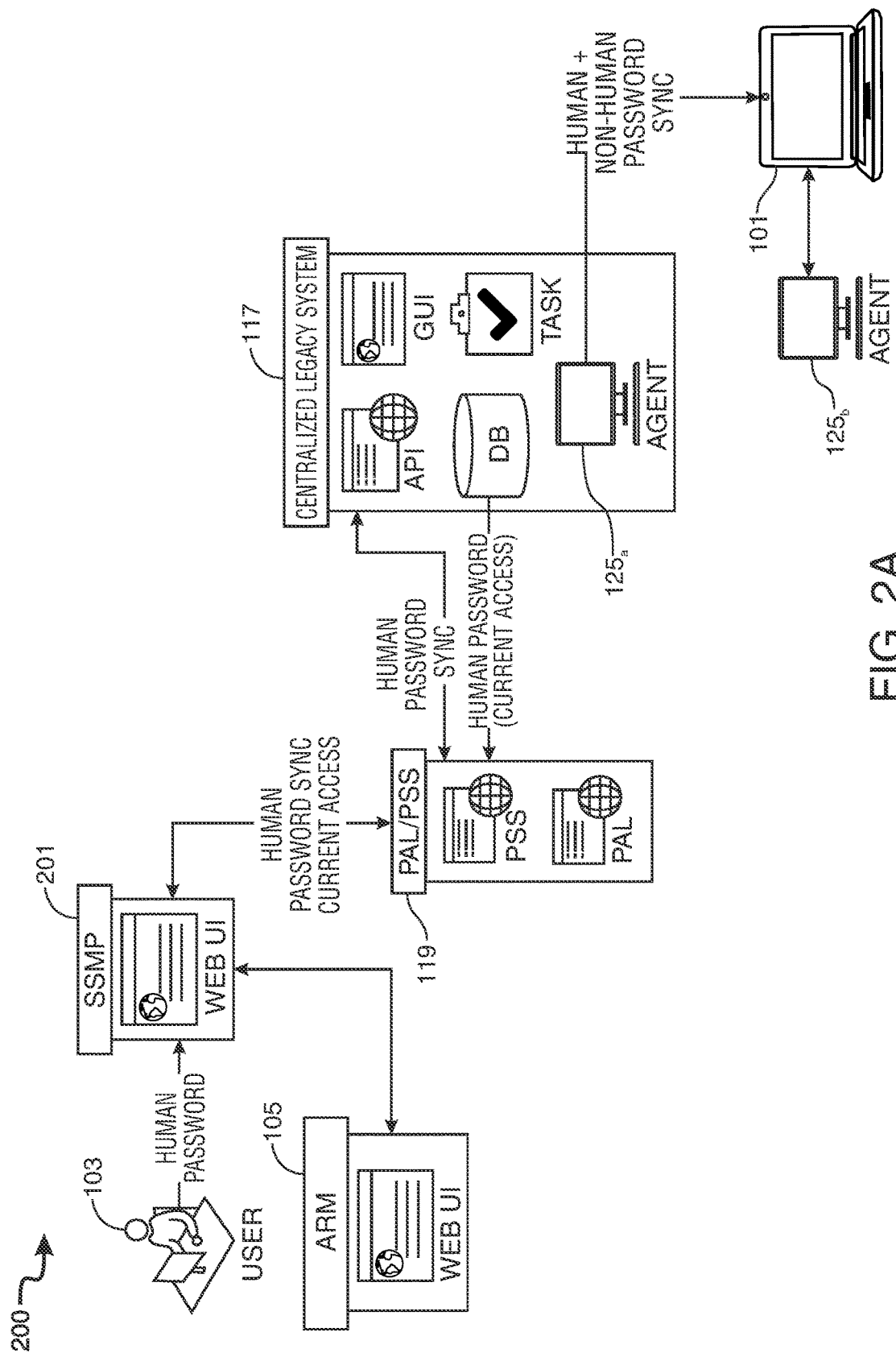
FIG. 2A shows a prior-art process flow.

FIG. 2A shows illustrative prior process 200 for password synchronization of computer server 101. Procedures for password synchronization ensure that a user password for access to network resources, such as computer server 101 is coordinated across various computer servers. Password synchronization allows a user to remember a single password instead of multiple passwords for different computer servers or software services.

FIG. 2A shows that user 103 may initiate a password synchronization request by pressing ctl+alt+del key sequence on a computer terminal. The key sequence may initiate a system call to self-service password management service ("SSPM") 201. SSPM 201 may then initiate a system call to PAL/PSS 119 to determine a current password provisioned for user 103.

After retrieving the current user password, legacy system 117 may interact with PAL/PSS 119. Legacy system 117 may coordinate access to passwords for user 103 on computer server 101 and other network resources. Legacy system 117 may receive passwords associated with computer server 101 from agent 125*b* running on computer server 101. Receiving agent 125*a* running on legacy system 117 may gather password information from multiple instances of agent 125*b* which are each running on different network resources.

Based on the collective password information, legacy system 117 may determine whether passwords are synchronized for user 103 across multiple network resources. Legacy system 117 may log results of the password synchronization on CSDB 121 (shown in FIG. 1A).

Prior art process 200 utilizing legacy system 117 requires local agent 125*b* running on computer server 101. However, such a solution has undesirable consequences for complex enterprise environments. For example, local agent 125*b* may crash or otherwise be unavailable. When local agent 125*b* is not available, synchronization processes are unavailable for computer server 101. When considered on the scale of a complex enterprise environment, even a small percentage of downtime for local agent 125*b* may have significant negative impact on timely management of thousands of interconnected computer servers.

Additionally, local agent 125*b* itself consumes computing resources of computer server 101. Thus, local agent 125*b* may degrade performance of the computer server 101 even when a synchronization process is not being implemented. Additionally, across a complex enterprise environment, the collective computational resources consumed by multiple instances of local agents 125*b* running on thousands for host computer server may siphon substantial computing resources.

Figure 2B:
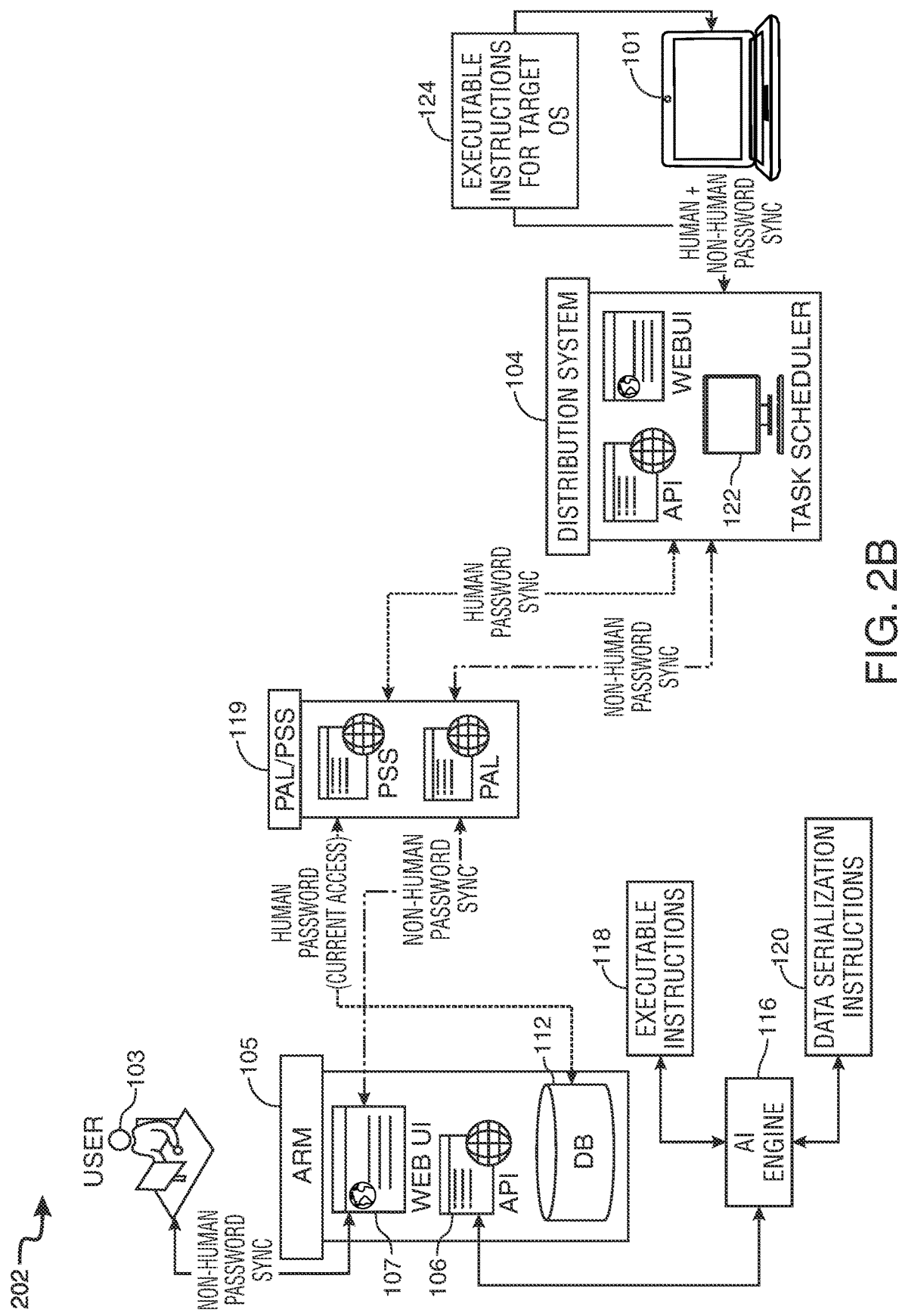
FIG. 2B shows illustrative systems and process flows in accordance with principles of the disclosure.

FIG. 2B shows improved shows improved process and systems 202 for implementing password synchronization.

FIG. 2B shows that user 103 may initiate a password synchronization request by pressing ctl+alt+del key sequence. ARM system 105 may be configured to detect the key sequence via Web UI 107. API 106 of ARM system 105 may initiate an automated system call to PAL/PSS 119. The automated system call may pull usernames and/or passwords provisioned for user 103 to access computer server 101.

Based on the username/password information obtained from PAL/PSS 119, ARM system 105 may submit a password synchronization request to distribution system 104. In some embodiments, subsystem PAL/PSS 119 may submit a password synchronization request to distribution system 104. A password synchronization request may include executable instructions 118 and/or data-serialization instructions 120 formulated by ARM system 105 and/or subsystem PAL/PSS 119.

Upon receipt of the password synchronization request, distribution system 104 may trigger agentless execution of the password synchronization request one or more network resources such as computer server 101. Distribution system 104 may relay a results of the password synchronization request back to PAL/PSS 119. If a password discrepancy is detected, PAL/PSS 119 or ARM system 105 may formulate a new set of executable instructions and/or data-serialization instructions for synchronizing passwords of user 103.

Distribution system 104 may be utilized to provision all the network resources necessary for synchronizing passwords of user 103. FIG. 2B shows that process 202 may be utilized for password synchronization of non-human (e.g., system) accounts.

Distribution system 104 does not require use any local agents 125b running on computer server 101 and no additional custom security infrastructure. Distribution system 104 may directly provision computer server 101 or other network resource in accordance with password synchronization instructions received from ARM system 105. Distribution system 104 may utilize a cryptographic network protocol such as SSH for transmitting the executable thread securely to computer server 101.

Distribution system 104 may generate system-specific executable instructions 124 based on the data and parameters provided by ARM system 105 in YAML or other suitable data-serialization language file. Distribution system 104 may formulate system-specific executable instructions 124 for computer server 101 using commands that, when executed on computer server 101, perform a reconciliation process on computer server 101 in accordance with the parameters defined in the set of instructions (provided by ARM system 105).

Distribution system 104 may transfer executable instructions 124 to computer server 101 using a native secure transfer protocol. Illustrative secure transfer protocols may utilize port 22. Illustrative secure transfer protocols may include SSH-2 or Windows Remote Management.

Figure 3:
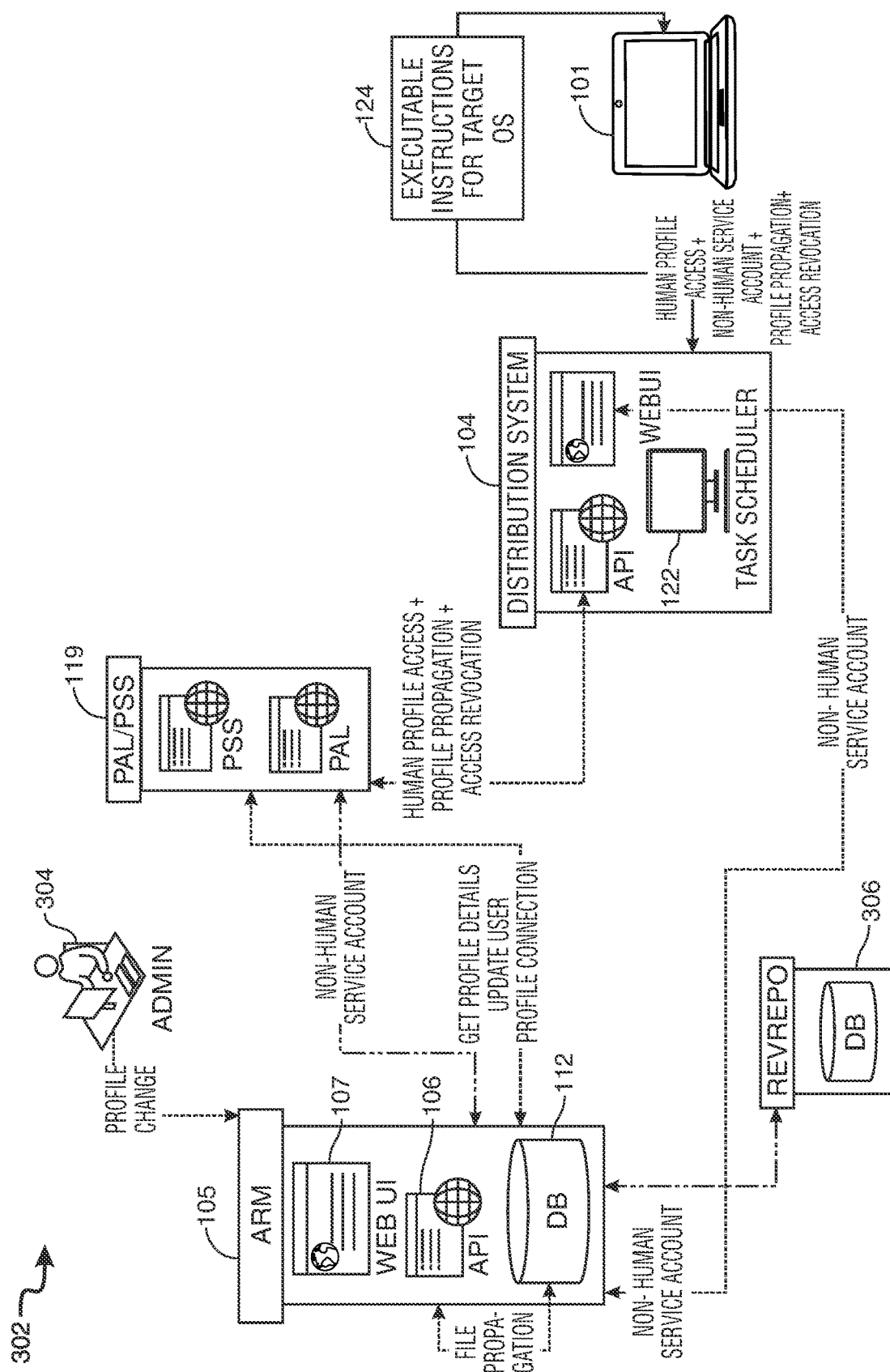
FIG. 3 shows illustrative systems and process flows in accordance with principles of the disclosure.

FIG. 3 shows an illustrative improved process and system 302 for implementing human and non-human access provisioning/de-provisioning. A profile access provisioning request may be submitted by administrator 304 using Web UI 107 of ARM system 105. The request submitted by administrator 304 may request that a target user be provisioned additional access permission to a network resource, such as computer server 101. The request submitted by administrator 304 may request the target user be de-provisioned and permission for accessing computer server 101 be revoked. Provisioning or de-provisioning requests may be submitted in response to change in employment status of a target user.

API 106 of ARM system 105 may access subsystem PAL/PSS 119 to determine to determine what if any, access permissions and passwords are provisioned for the target user on computer server 101 or any other network resource. If a change to the permissions/passwords has been requested by administrator 304, PAL/PSS 119 may formulate instructions for implementing the change. Such a formulated instruction may include executable instructions 118 and/or data-serialization instructions 120 formulated by ARM system 105 and/or subsystem PAL/PSS 119.

PAL/PSS 119 may initiate a function call to distribution system 104. The function call from PAL/PSS 119 to distribution system 104 may instruct distribution system 104 to provision computer server 101 or any other network resources in accordance with the instructions formulated by PAL/PSS 119.

Revocation repository 306 may store instructions used to revoke access to a network resource. Revocation repository 306 may store user accounts that have been revoked from accessing a network resource.

Figure 4:
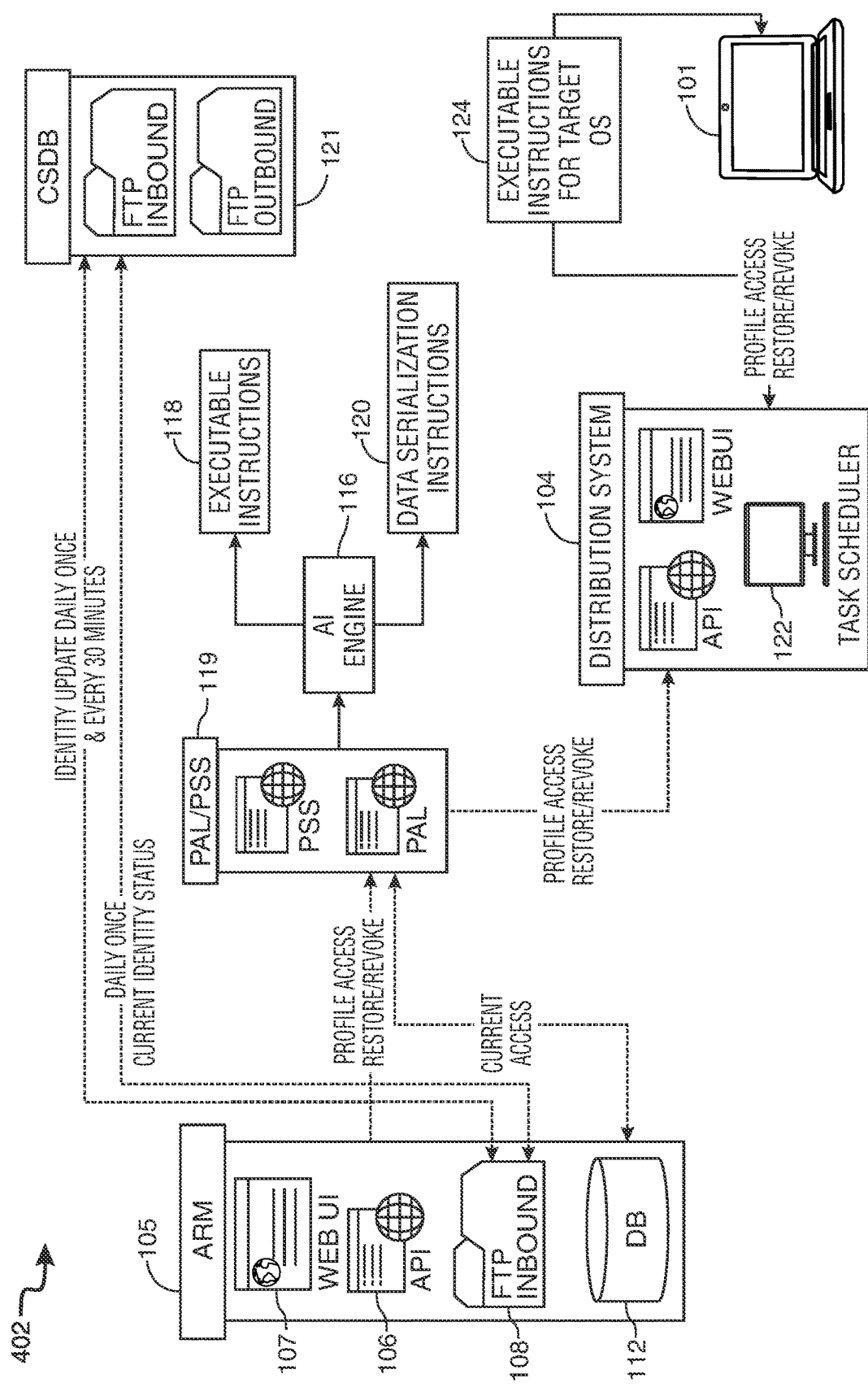
FIG. 4 shows illustrative systems and process flows in accordance with principles of the disclosure.

FIG. 4 shows an illustrative improved process and system 402 that may be initiated by CSDB 121. Process 402 implements agentless lifecycle event management. CSDB 121 may push changes to user access data to ARM system 105. CSDB 121 may transfer the changes to FTP inbound folder 108 of ARM system 105. In a preferred embodiment, CSDB 121 may transfer differences in user access data to ARM system 105 every 30 minutes.

When ARM system 105 detects receipt of changes from CSDB 121, ARM server 105 may initiate an update of user permissions associated with network resources, such as computer server 101. API 106 of ARM server 105 may initiate an automated system call to PAL/PSS 119. The automated system call to PAL/PSS 119 may push user account data that needs to be updated. FIG. 4 shows an embodiment where PAL/PSS 119 directly interacts with AI engine 116. In other embodiments (see e.g., FIG. 1B) ARM system 105 may interact directly with AI engine 116.

An update may include deleting user account data. Deleting user account data may revoke user access from all network resources. An update may include instructing PAL/PSS 119 to provision access for a new user or restore access for a user returning from leave. An update to user account data may be responsive to a change in employment status recorded on CSDB 121.

Based on the instructions received from API 106, PAL/PSS 119 may submit an access provisioning request to distribution system 104. Distribution system 104 may trigger agentless execution of the provisioning in connection with a network resource, such as computer server 101.

Distribution system 104 may provision the network resource in accordance with the instructions received from ARM system 105. Based on instructions received from ARM system 105, distribution system 104 may generate system-specific executable instructions for provisioning a network resource using commands that implement the set of instructions on an operating systems running on each of the one or more of the network resources. Distribution system 104 may relay a results of the password synchronization request back to PAL/PSS 119 and/or ARM system 105.

Thus, methods and apparatus for AGENTLESS CONTROL SYSTEM FOR LIFECYCLE EVENT MANAGEMENT are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. An artificial intelligence ("AI") system for automated access reconciliation across a network of at least one thousand computer servers, the system comprising:
   a database that stores a change in employment status of a user;
   an access rights management ("ARM") computer server that:
      examines the change in employment status in the database;
      determines a configuration change for the network in response to the change to employment status; and
      generates:
         an inventory file listing a first set of computer servers and a second set of computers servers on the network impacted by the configuration change, a location of each of the first and second sets of computer servers on the network and a sequential order for reconfiguring the first set of computer servers; and
         a set of instructions that comprise parameters for reconfiguring the first and second sets of computer servers in response to the configuration change, wherein the set of instructions are in a data-serialization language and do not include any executable commands; and
   an agentless distribution system that:
      receives the inventory file and the set of instructions;
      formulates a first set of scripts executable on the first set of computer servers that enforces the sequential order and is based on the inventory file and the set of instructions;
      formulates a second set of scripts executable asynchronously on the second set of computer servers and is based on the inventory file and the set of instructions;
      transfers the first set of scripts to the first set of computer servers and thereby triggers reconfiguring, in the sequential order, of the first set of computer servers listed in the inventory file in accordance with the set of instructions;
      transfers the second set of scripts to the second set of computer servers and thereby triggers asynchronous reconfiguring of the second set of computer servers listed in the inventory file in accordance with the set of instructions; and
      provides confirmation to the ARM computer server that the first and second sets of computer servers have been reconfigured.

2. The AI system of claim 1, wherein the configuration change is a restoration or a revocation of user access to the first and second sets of computer servers.

3. The AI system of claim 1, wherein the configuration change is a restoration or a revocation of a profile that provides access for two or more users to software application running on the first and second sets of computer servers.

4. The AI system of claim 1, wherein:
   the set of instructions formulated by the ARM computer server comprises a generic list of functions and associated parameters executable by the agentless distribution system; and
   in response to receiving the set of instructions, the agentless distribution system generates system-specific executable instructions for the first and second sets of computer servers listed in the inventory file.

5. The AI system of claim 4, wherein the agentless distribution system formulates the system-specific executable instructions using commands that implement the set of instructions on operating systems running on the first and second sets of computer servers listed in the inventory file.

6. The AI system of claim 5, wherein the agentless distribution system transfers the system-specific executable instructions to the first and second sets of computer servers using a native secure transfer protocol over port 22.

7. The AI system of claim 1, wherein the ARM computer server formulates the set of instructions using:
   code extracted from a library of functions executable by the agentless distribution system; and
   a reference to the first and second sets of computer servers defined in the inventory file.

8. The AI system of claim 1, wherein, the ARM computer server comprises a credential validation subsystem that determines:
   whether the first and second sets of computer servers are impacted by the configuration change based on whether the first and second sets of computer servers host a target user account impacted by the configuration change; and
   an updated username and an updated password for the target user account.

9. The AI system of claim 1, wherein the database securely transfers any changes in the employment status to the ARM computer server at least once every 30 minutes.

10. An artificial intelligence ("AI") computer program product for controlling access to software hosted on a network of at least one thousand computer servers, the AI system comprising:
   an access rights management ("ARM") computer server that:
      examines employment records stored on a database;
      determines, based on examination of the employment records, a change to a user account for accessing the computer servers on the network;
      generates an updated user account that synchronizes the employment records and the change to the user account; and
      formulates an inventory file that includes a location and order for provisioning:
         a first subset of the computer servers asynchronously in accordance with the updated user account; and
         a second subset of the computer servers sequentially in accordance with the updated user account;
      formulates a set of instructions that provisions the first subset and second subset of computer servers in accordance with the updated user account, wherein the set of instructions is in a data-serialization language and does not include any executable commands; and
   an agentless distribution system that:
      receives the inventory file and the set of instructions from the ARM computer server; and
      based on the inventory file and the set of instructions:
         formulates a first set of scripts executable asynchronously on the first subset of computer servers;
         formulates a second set of scripts executable sequentially on the second subset of computer servers;
         transfers the first set of scripts to the first subset of computer servers and thereby triggers asynchronous reconfiguring of the first subset of computer servers;
         transfers the second set of scripts to the second subset of computer servers and thereby triggers reconfiguring, sequentially, of the second subset of computer servers; and provides confirmation to the ARM computer server that the first subset and the second subset of computer servers has been reconfigured.

11. The AI system of claim 10, wherein the change to the user account comprises changing a username and password associated with the user account.

12. The AI system of claim 10, wherein the change to the user account disables the user account on the computer servers.

13. The AI system of claim 10, wherein the change to the user account deletes the user account from the computer servers.

14. The AI system of claim 10, wherein the change to the user account enables the user account on the computer servers.

15. The AI system of claim 10, wherein the change to the user account:
    disables an access profile that includes the user account and at least one other user account; and
    creates a new profile that does not include the user account and includes the at least one other user account.

16. An artificial intelligence ("AI") method for automated lifecycle event management for user accounts across a network of at least one thousand computer servers, the method comprising:
    detecting a change in employment status associated with a target user;
    locating a user account associated with the target user;
    generating an updated user account for the target user that synchronizes the employment status and access to the network;
    formulating an inventory file that includes a location and order for provisioning:
        a first subset of the computer servers on the network asynchronously in accordance with the updated user account; and
        a second subset of the computer servers on the network sequentially in accordance with the updated user account;
    formulating a set of parameters for the provisioning the first and second subsets of computer servers in a data-serialization language that does not include any executable commands;
    pushing the updated user account, the set of parameters and the inventory file to an agentless distribution system;
    formulating system-specific executable instructions for provisioning each of the first and second subsets of the computer servers in accordance with the updated user account, inventory file and set of parameters; and
    pushing the system-specific executable instructions to the first and second subsets of computer servers and thereby provisioning:
        the first subset of computer servers asynchronously such that access is only available to the first subset of computer servers using credentials associated with the updated user account; and
        the second subset of computer servers sequentially such that access is only available to the second subset of computer servers using credentials associated with the updated user account.

17. The AI method of claim 16, wherein the updated user account comprises revoking access rights from the target user.

18. The AI method of claim 17, wherein the system-specific executable instructions comprise instructions for attempting to access the first and second subsets of computer servers using credential associated with the user account before detecting the change in the employment status and thereby confirming that the user account is not accessible using the access rights revoked from the target user.

19. The AI method of claim 16, further comprising submitting the credentials associated with the updated user account to a validation system that determines whether the updated user account complies with a network policy in effect on the first and second subsets of computer servers.

20. The AI method of claim 16, further comprising formulating the system-specific executable instructions using commands executable by operating systems running on each of the first and second subsets of computer servers listed in the inventory file.

* * * * *